March 2, 1965 W. F. CLEMENCY ET AL 3,171,901
LOUD-SPEAKING TELEPHONE
Filed Oct. 4, 1960
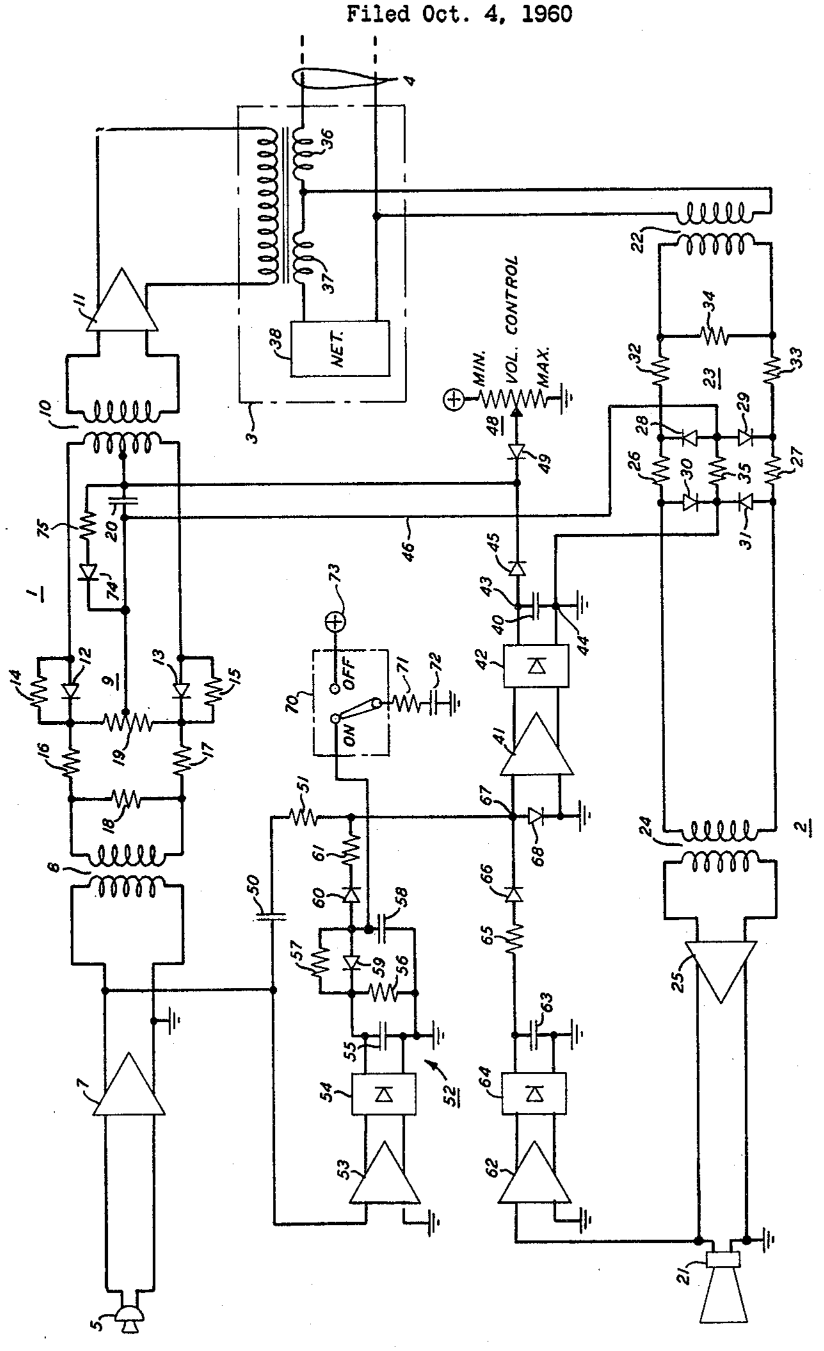
INVENTORS W. F. CLEMENCY
W. D. GOODALE, JR.
BY V. P. Priolo
ATTORNEY

United States Patent Office 3,171,901
Patented Mar. 2, 1965

3,171,901
LOUD-SPEAKING TELEPHONE

William F. Clemency, Murray Hill, and Walter D. Goodale, Jr., Chatham, N.J., assignors to Bell Telephone Laboratories, Incorporated, New York, N.Y., a corporation of New York Filed Oct. 4, 1960, Ser. No. 60,476
14 Claims. (Cl. 179—81)

This invention relates to loud-speaking telephone sets, and more particularly, to arrangements for improving the performance of voice switched speakerphones in the presence of audible background noise.

As is familiar to those skilled in the art, loudspeaking telephone sets, often referred to as speakerphones, comprise transmitting and receiving channels respectively operative, as their names imply, to transfer audible messages between local and remote subscribers. Both the microphone conventionally included in the transmitting channel and the loudspeaker similarly included in the receiving channel, are adapted to acoustically link a substantial portion of the room in which the set is located. In order to prevent the occurrence of "singing" and objectional "echo" due in part to sidetone and acoustic coupling, numerous methods have been devised for isolating one channel from the other during a conversation, that is to say, rendering one of the channels substantially inoperative while the other is functioning. The most successful of these methods have been found to be voice switching arrangements in which energy propagating through the channels is used to determine the operating mode, i.e. transmitting or receiving, of the set. The concept of voice switching is well known in the loud-speaking telephone art, one illustrative example of a system embodying its principles being disclosed in a copending application Serial No. 783,417, now Patent No. 3,046,354, filed December 29, 1958, in the name of W. F. Clemency.

One inherent weakness of prior art voice switching arrangements is their tendency to place a speakerphone in the transmitting mode of operation in response to background noises which, although in the audible range, are not speech signals. Noise energy emitted by a fan, an air conditioner, or road traffic, are several examples of detectable sounds which fall into this category. While at lower levels background noise undesirably enhances speech clipping, at higher levels, it may actually attain sufficient magnitude to substantially hinder speech signals in the receiving channel from switching the set's operating mode. Although circuits have been conceived for manually setting the threshold at which a speakerphone's operating mode is switched, the need in certain locations to frequently adjust for varying noise conditions has seriously detracted from the desirability of such arrangements.

Accordingly, it is a general object of this invention to improve the operation of speakerphones subjected to audible background noise.

It is another general object of this invention to improve the performance of speakerphones in reverberant locations.

It is another object of this invention to render the voice switching circuitry of a loud-speaking telephone set substantially insensitive to background noise.

It is another object of this invention to reduce speech clipping in a voice switched speakerphone.

It is still another object of this invention to automatically adjust the voice switching circuitry of a speakerphone to compensate for different levels of background noise.

According to the invention in one of its principal aspects a voice switched speakerphone set having transmitting and receiving channels is provided with a discriminator circuit which distinguishes between speech and slowly varying noise energy detectable by the transmitting channel, and generates an output signal substantially proportional to the latter which is applied to control the sensitivity of the set's voice switching circuitry.

As one of its basic features, the invention includes discriminator apparatus for generating a unipolar signal substantially proportional to the slowly varying components of an applied multifrequency wave. In an illustrative embodiment of this apparatus, first and second capacitive circuits are coupled together through a polarity sensitive variable impedance network comprising a diode bridged across a resistor. The polarity of the diode is in the direction of forward conduction from the second to the first circuit. While the components of the first storage circuit are proportioned to provide a relatively fast time constant, the second storage circuit, by virtue of the variable impedance arrangement, is adapted to have its time constant switch between relatively high and low values in accordance with the polarity of energy appearing across the diode. To complete the arrangement, a rectifier is connected to energize the fast time constant circuit with fluctuating unidirectional signals. By these means, the capacitor of the second, or variable time constant circuit is charged in substantial proportion to the slowly varying components of the fluctating signal applied to the first circuit. If the level of the slowly varying component of the fluctuating signal decreases, the second circuit rapidly responds by discharging into the first circuit through the diode until the new level of the slowly varying energy is reached.

Another feature of the invention comprises a voice switching arrangement for isolating from one another the channels of a loud-speaking telephone set in accordance with the difference in levels of energy propagating through the respective channels. In one configuration, current controlled impedance elements are connected in both the receiving and transmitting channels of a speakerphone, and a direct-current path, including an amplifier and a rectifier, serially links all the elements. Bridged across the input terminals of the amplifier is a gain control circuit for regulating the flow of energy through the direct-current path. Sensing means are providfed for generating first and second signals respectively proportional to the level of energy propagating through the channels, the first signal being applied to energize the amplifier while the second is applied to govern the gain control circuit.

The foregoing and numerous other objects and features of the invention will be more thoroughly understood by reference to the following detailed description of a speakerphone set having noise compensation apparatus, and the drawing which illustrates a preferred embodiment of a loudspeaking telephone including a noise discrimination circuit arranged in accordance with the principles of the invention.

With reference directed to the drawing, a loudspeaking telephone set is illustrated comprising a transmitting channel 1, a receiving channel 2, and a hybrid network 3 for electrically coupling the channels to a telephone line 4. Transmitting channel 1 includes a microphone 5 connected to hybrid circuit 3 through amplifier 7, transformer 8, a balanced current controlled variable impedance device 9, transformer 10, and amplifier 11 serially connected in the order recited. Variable impedance device 9 is a balanced arrangement including a pair of diodes 12 and 13, respectively, connected in series with the channel conductors, and resistors 14 and 15, respectively, bridged across the diodes. As shown, both diodes are poled to be forward conducting to energy flowing in channel 1 toward microphone 5. Diodes 12 and 13 are of the semiconductor variety characterized by their impedance to alternating energy being inversely related to the applied component of direct current. Situated between the secondary winding of transformer 8 and the cathode electrodes of diodes 12 and 13 is a resistance pad comprising resistors 16 and 17, respectively, connected in series with the channel conductors, and resistors 18 and 19 bridged across the channel conductors on either side of resistors 16 and 17. A decoupling capacitor 20, shunted by serially connected semiconductor diode 74 and resistor 75, is connected in variable impedance device 9 having its terminal points disposed between center taps of resistor 19 and the primary coil of transformer 10.

Receiving channel 2 includes a loudspeaker 21 to which hybrid circuit 3 is coupled through transformer 22, a balanced, current controlled variable impedance arrangement 23, transformer 24 and amplifier 25. Variable impedance device 23 includes resistors 26 and 27, respectively, connected in series with the channel conductors, and two pairs of diodes, in back-to-back configuration, bridged across the channel on either side of resistors 26 and 27. One pair, shown as diodes 28 and 29, have their anode electrodes joined together while the other pair, diodes 30 and 31, are coupled together by their cathodes. Diodes 28 through 31 are substantially similar to their counterparts 12 and 13 and, therefore, exhibit similar characteristics. Connected between the secondary winding of transformer 22 and the path formed by diodes 28 and 29 is a resistance pad comprising resistors 32 and 33, respectively, connected in series with the channel conductors and a shunt resistor 34. To complete variable impedance device 23, a resistor 35 is connected between the junctions of diodes 28 and 29 and diodes 30 and 31.

Hybrid circuit 3 is of conventional bridge design having as its arm coils 36 and 37, telephone line 4, and network 38. While energy propagating through transmitting channel 1 is transformer coupled to the hybrid circuit across a first pair of diametrically opposite junctions located at the extreme ends of coils 36 and 37, energy propagating through line 4 is coupled to receiving channel 2 via transformer 22 which has its primary winding connected to the bridge's second pair of diametrically opposite junctions. Network 38 is of the self-balancing variety conventionally used in telephone practice which adjusts its impedance to match that of line 4 in accordance with the magnitude of direct current applied to its terminals.

Diodes 12, 13 and 28 through 31 are linked together through a direct-current conducting path which is energized by the potential developed across a storage capacitor 40 serially connected in the path. The charging circuit for capacitor 40 includes an amplifier 41 and a rectifier 42 which may be of the conventional four-diode bridge variety having positive and negative output terminals 43 and 44, respectively. The path is formed by the connection of positive terminal 43 to the anode of a diode 45, the cathode of which is in turn joined to the center tap of the primary winding of transformer 10. The path continues through the primary winding of transformer 10 through diodes 12 and 13 and down to a center tap of resistor 19. From the center tap of resistor 19 the path continues through a conductor 46 connected to the junction of the anodes of diodes 28 and 29, through the parallel branches comprising diodes 28 and 30 and diodes 29 and 31, and is completed by the connection of the junction of the cathodes of diodes 30 and 31 to grounded negative terminal 44. Connected to the path at the cathode of diode 45 is the slide wire of a volume control potentiometer 48 comprising a source of positive potential grounded through a resistor. The slide wire includes a diode 49 poled to have its cathode join the cathode of diode 45.

Two parallel detecting circuits are connected to an output terminal of amplifier 7 for sensing energy propagating through the transmitting channel. While the first detector comprises a capacitor 50 in tandem with a resistor 51, the components being proportioned to translate substantially the entire spectral range of audible signals, the second comprises a discriminator 52 adapted to provide a signal substantially proportional to only the slowly varying components of an audible wave. Discriminator 52 includes an input amplifier 53 connected to a rectifier 54 having output terminals forked across a capacitor 55 in shunt with a resistor 56. The negative terminal of rectifier 54 is connected to a reference potential shown in the drawing as ground. Connected in parallel with capacitor 55 and resistor 56 is a series R-C circuit comprising resistor 57 and capacitor 58, resistor 57, in turn, being shunted by a diode 59 poled to conduct current in its forward direction from capacitor 58 to capacitor 55.

A charging circuit is connected in parallel with capacitor 58 comprising one contact of a two-position switch 70, a resistor 71, and capacitor 72 connected in series to ground. The other contact of switch 70 is coupled to positive source of potential 73. The armature of switch 70 is actuated by circuitry, for example the conventional switchhook mechanism of a dial telephone set which ordinarily accompanies a speakerphone for purposes of both privacy and signaling, which is responsive to the initiation and termination of a call. The output signal of discriminator 52 is tapped from the junction of resistor 57 and capacitor 58 by serially connected diode 60 and resistor 61, the diode being poled to conduct current away from the junction.

Connected to an output terminal of amplifier 25 is a third detecting circuit adapted to derive a direct-current signal representative of the energy propagating through receiving channel 2. The detector comprises an amplifier 62 connected to energize a storage capacitor 63 through a rectifier 64. Rectifier 64 has its negative terminal connected to a source of reference potential, shown in the drawing as ground, and its positive terminal coupled to an output circuit comprising resistor 65 and diode 66 poled to conduct current away from capacitor 63. The three detecting circuits desribed above are united at a junction 67 which is coupled to ground through diode 68. Diode 68 is substantially similar to those included in variable impedance devices 9 and 23 and has its anode and cathode terminals respectively bridged across the input terminals of amplifier 41.

Initially the set resides in its receive mode of operation, that is to say, series diodes 12 and 13 of variable impedance device 9 act as high loss elements to energy propagating in the transmitting channel while shunt diodes 28 through 31 of variable impedance device 23 function as low loss elements to energy coupled to the receiving channel. The loss characterizing each channel during a quiescent period, i.e., when no voice energy is applied to the set, is determined by the slide wire setting of volume control potentiometer 48. As the slide wire is moved toward the potentiometer's positive source, the loss exhibited by transmitting channel 1 is decreased while the loss exhibited by receiving channel 2, conversely, is increased. As the slide wire is moved toward ground, on the other hand, the change in loss exhibited by the channels is reversed. The slide wire is set in accordance with the gain required to produce a satisfactory level from loudspeaker 21. In a noise environment where a relatively high volume is desirable, the slide wire is positioned toward the MAX end of the scale, while on the other hand, when only relatively low receiving channel gain is required the slide wire is disposed toward the MIN end of the scale. In addition to volume control, potentiometer 48 allows regulation of the quantity of loss switched between the channels when the speakerphone switches its mode of operation, the maximum quantity being switched when the slide is in the MAX position and the minimum quantity being switched when the slide is in the MIN position.

When a local subscriber to a call talks into his microphone 5, an alternating-current signal representative of his resulting speech waves is applied to diode 68 by the detecting circuit comprising capacitor 50 and resistor 51. This signal energizes amplifier 41 which charges capacitor 40 through rectifier 42. When sufficient potential is developed across capacitor 40, current is driven through the path linking the diodes of variable impedance devices 9 and 23. By these means, the loss exhibited by series diodes 12 and 13 to alternating energy is decreased and conversely the loss exhibited by shunt diodes 28 through 31 to alternating energy is increased thereby reversing the operating mode of the set to the transmit condition. Diode 74 and resistor 75 along with resistor 35 are proportioned to equalize the inverse gain changes in channels 1 and 2.

If the remote subscriber to the call desires to break into the conversation, he merely talks into his microphone, or corresponding apparatus if a conventional telephone set is used, and a speech signal is transmitted through line 4 and hybrid 3 to receiving channel 2. During the local subscriber's intersyllable lulls, the remote subscriber's speech waves are translated by transformer 24 and amplifier 25 and are applied to charge capacitor 63 through amplifier 62 and rectifier 64. The potential developed across capacitor 63 drives unidirectional current through resistor 65 and diodes 66 and 68, thereby lowering the impedance of the latter to alternating energy. In a sense diode 68 functions as a gain control circuit, the output signal induced across its terminals in response to an alternating wave being controlled by applied direct current. With the alternating signal developed across diode 68 consequently reduced, the direct-current energy linking the diodes of variable impedance elements 9 and 23 is similarly reduced thereby initiating a regenerative process resulting in the set's operating condition being switched from the transmitting to the receiving mode. The preferred embodiment shown in the drawing, although only one arrangement of the invention, offers the advantage of a wide dynamic range, that is to say, the range of volume levels in which either subscriber to a call can assume control over the set's operating mode is relatively large. As is evident to one skilled in the art, the dynamic range of the configuration depicted in the drawing extends up until the point at which any one of the amplifiers involved overloads.

Discriminating circuit 52, in accordance with the principles of the invention, prevents the set's mode of operation from being switched in response to background sounds emitted by fans, air conditioners, street noises, or the like. As is well known in the communications field, speech signals differ considerably from undesirable background noises, the former fluctuating rapidly at the syllabic frequency between nulls and relatively high amplitude peaks while the latter varies slowly with time over a relatively small range of amplitudes. When a speech signal is applied to discriminator 52 only a small quantity of charge accumulates on capacitors 58 and 72 because in charging through resistor 57 the storage circuit including capacitors 58 and 72 is slow acting during the rising portion of a cycle, but by virtue of diode 59, is fast acting during discharge. Thus, energy stored on the plates of capacitors 58 and 72 during the rise of a speech wave to a peak is rapidly released through diode 59 during the wave's fall to a null. When, however, a signal characterized by relatively invariant level, such as background noise for example, is applied to discriminator 52, a potential gradually develops across capacitors 58 and 72 having a level equal to that of the signal applied. It should be apparent by virtue of the superposition theorem that if a composite signal including both speech and background noise waves is applied to discriminator 52, the potential developed across capacitors 58 and 72 rises to the level of the latter.

The potential developed across capacitors 58 and 72 drives unidirectional current through resistor 61 and diodes 60 and 68. Capacitor 50 and diode 66 serve to prevent this current from being diverted to alternate paths. The unidirectional current applied to diode 68 lowers that element's impedance to alternating energy applied through resistor 51. In this manner the sensitivity of diode 68 to alternating energy is reduced in proportion to the background noise waves detected by microphone 5.

Since there is a disparity between the charge and discharge time constants of the storage circuit including capacitor 58, discriminator circuit 52 reacts differently to slowly varying signals having a rising level than it does to similar signals having a falling level. When the level of slowly varying energy applied to discriminator 52 rises, a relatively large period of time is required for the potential across capacitor 58 to increase sufficiently to alter substantially the sensitivity of diode 68. Consequently, the occasional slowly varying components contained in speech waves, in contradistinction to the continuing nature of background noise energy, exercise only a negligible effect on diode 68. When, on the other hand, the level of slowly varying energy applied to discriminator circuit 52 falls, the storage circuits fast discharge time constant allows the potential across capacitors 58 and 72 to decrease rapidly to the new level. As a result, if background noise suddenly ceases, full sensitivity is rapidly restored to diode 68.

Since the charging time of the storage circuit comprising capacitors 58 and 72 is relatively long, potential source 73 in conjunction with switch 70 functions to rapidly desensitized diode 68 in accordance with the level of background noise present when the speakerphone is activated to receive an incoming call. When the speakerphone is not in use, the armature of switch 70 rests on its Off contact thereby allowing capacitor 72 to charge. When the speakerphone is activated, the armature shifts to its On contact, thereby discharging capacitor 72 through the low impedance path comprising capacitor 58 and the path including diode 68. By these means, discriminator 52 is quickly adapted to room noise conditions thus preventing high level noise from initially switching the speakerphone into the transmitting mode of operation.

Since changes may be made in the above-described arrangement and different embodiments may be devised by those skilled in the art without departing from the spirit and scope of the invention, it is to be understood that the foregoing description and accompanying drawing are merely illustrative of the principles of the invention and not to be construed in a limiting sense.

What is claimed is:

1. A loud-speaking telephone set comprising a transmitting channel including a microphone, a receiving channel including a loudspeaker, attenuating means connected to each of said channels, voice controlled means connected to said attenuating means for inversely varying the gains of said channels with respect to each other, discriminating means for deriving an electrical signal substantially proportional to slowly varying noise waves translated by said transmitting channel, and means responsive to said electrical signal for controlling the sensitivity of said voice controlled means.

2. A loud-speaking telephone set comprising a transmitting channel including a microphone, a receiving channel including a loudspeaker, gain control means connected to each of said channels, circuit means connected to said control means for inversely varying the gains of said channels with respect to each other in accordance with the levels of energy propagating through said channels, frequency discriminating means for deriving an electrical signal substantially proportional to slowly varying noise waves transmitted by said transmitting channel and means for regulating the sensitivity of said circuit means in accordance with said slowly varying noise waves.

3. A loud-speaking telephone set comprising a transmitting channel including a microphone, a receiving channel including a loudspeaker, a hybrid circuit for coupling said channels to a telephone line, voice controlled means for inversely varying the gains of said channels in accordance with an input wave representative of the energy levels propagating through the channels, and discriminating means for regulating the sensitivity of said voice controlled means, said discriminating means comprising means for sensing energy detectable by said microphone, means for rectifying said sensed energy, means for deriving an electrical signal substantially proportional to the slowly varying noise component of said rectified energy, and means for applying said electrical signal to control said input wave of said voice controlled means.

4. A loud-speaking telephone set comprising a transmitting channel including a microphone, a receiving channel including a loudspeaker, a hybrid circuit for coupling said channels to a telephone line, current controlled attenuating means connected in each of said channels, means including an amplifier for applying control current to said attenuating means, means for energizing said amplifier with a first signal proportional to the level of energy propagating in said transmitting channel, means for energizing said amplifier with a second signal proportional to the level of energy propagating in said receiving channel, frequency discriminating means for deriving a third signal substantially proportional to the slowly varying noise component of audio waves detectable by said microphone, and means responsive to said third signal for controlling the gain of said amplifier.

5. A loud-speaking telephone set comprising a transmitting channel including a microphone, a receiving channel including a loudspeaker, a hybrid circuit for coupling said channels to a telephone line, current controlled attenuating means connected in each of said channels, means for providing a current path serially linking said attenuating means, a controllable source of electrical potential connected in said current path, means connected to said transmitting channel for varying the potential of said controllable source in accordance with the level of energy propagating in said transmitting channel, means connected to said receiving channel for varying the potential of said controllable source in accordance with the level of energy propagating in said receiving channel, discriminating means connected to said transmitting channel for deriving a signal substantially proportional to the slowly varying noise energy propagating in said transmitting channel, said discriminating means being further connected to vary the potential of said controllable source in accordance with said signal.

6. A loud-speaking telephone set comprising a transmitting channel including a microphone, a receiving channel including a loudspeaker, a hybrid circuit for coupling said channels to a telephone line, first and second current controlled attenuating means respectively connected in said transmitting and receiving channels, said first attenuating means being connected in series and said second attenuating means connected in shunt with their respective channels, means for providing a path for direct current to link both of said attenuating means, a source of electrical potential connected in said current path, said source having a pair of input control terminals, variable impedance means connected across said input terminals, means for applying a first signal to said variable impedance means representative of the level of energy propagating in said transmitting channel, means for applying a second signal to said variable impedance means representative of the level of energy propagating in said receiving channel, discriminating means for deriving a third signal substantially proportional to the slowly varying noise energy propagating in said transmitting channel, and means for applying said third signal to vary the impedance of said variable impedance means.

7. A loud-speaking telephone set in accordance with claim 6 wherein said current controlled attenuating means and said variable impedance means comprise semiconductor diodes.

8. A loud-speaking telephone set in accordance with claim 7 wherein said first signal is characterized by alternating current and said second and third signals are characterized by unidirectional current having like relative polarities.

9. A loud-speaking telephone set comprising a transmitting channel, including a microphone, a receiving channel including a loudspeaker, a hybrid circuit for coupling said channels to a telephone line, current controlled attenuating means connected in each of said channels, means including an amplifier for applying control current to said attenuating means, means for energizing said amplifier with a first signal proportional to the level of energy propagating in one of said channels, means for controlling the gain of said amplifier with a second signal proportional to the level of energy propagating in the other of said channels, frequency discriminating means for deriving a third signal substantially proportional to the slowly varying noise components of audio waves detectable by said microphone, and means responsive to said third signal for controlling the gain of said amplifier.

10. A loud-speaking telephone set in accordance with claim 9 wherein said means for controlling the gain of said amplifier includes a current controlled variable impedance device.

11. A loud-speaking telephone set in accordance with claim 10 wherein said current controlled variable impedance device comprises a semiconductor diode.

12. A loud-speaking telephone set comprising a transmitting channel including a microphone, a receiving channel including a loudspeaker, a hybrid circuit for coupling said channels to a telephone line, voice controlled means for inversely varying the gains of said channels in accordance with an input wave representative of the energy levels propagating through the channels, and discriminating means for regulating the sensitivity of said voice controlled means, said discriminating means comprising means for sensing energy detectable by said microphone, means for rectifying said sensed energy, means for deriving an electrical signal substantially proportional to the slowly varying noise component of said rectified energy, and means for applying said electrical signal to control said input wave of said voice controlled means, said means for deriving an electrical signal including a relatively fast time constant storage circuit and a relatively slow time constant storage circuit coupled together by a resistor and a unidirectional current conducting element arranged in parallel, said relatively fast time constant circuit being connected to said rectifying means and said relatively slow time constant circuit being connected to said voice switching means.

13. A loud-speaking telephone circuit in accordance with claim 12 wherein means are provided for rapidly storing energy in said relatively slow time constant storage circuit upon the activation of said set.

14. A loud-speaking telephone set comprising a transmitting channel including a microphone, a receiving channel including a loudspeaker, a hybrid circuit for coupling said channels to a telephone line, voice controlled means for inversely varying the gains of said channels in accordance with an input wave representative of the energy levels propagating through the channels, and discriminating means for regulating the sensitivity of said voice controlled means, said discriminating means comprising means for sensing energy detectable by said microphone, means for rectifying said sensed energy, means for deriving an electrical signal substantially proportional to the slowly varying noise component of said rectified energy, and means for applying said electrical signal to control said input wave of said voice controlled means, said means for deriving an electrical signal including a relatively fast time constant storage circuit and a relatively slow time constant storage circuit coupled together by a resistor and a unidirectional current conducting element arranged in parallel, said relatively fast time constant circuit being connected to said rectifying means and said relatively slow time constant circuit being connected to said voice switching means, and said unidirectional current conducting element being a diode poled for forward conduction of current from said slow to said fast time constant circuit.

References Cited in the file of this patent

UNITED STATES PATENTS

| | | |
|---|---|---|
| 2,183,389 | Bjornson | Dec. 12, 1939 |
| 2,964,598 | Parker | Dec. 13, 1960 |
| 3,027,429 | Eklov | Mar. 27, 1962 |

FOREIGN PATENTS

| | | |
|---|---|---|
| 882,420 | Germany | July 9, 1953 |